(12) United States Patent
Morgan

(10) Patent No.: US 9,219,669 B2
(45) Date of Patent: *Dec. 22, 2015

(54) DETECTING RESOURCE CONSUMPTION EVENTS OVER SLIDING INTERVALS IN CLOUD-BASED NETWORK

(71) Applicant: Red Hat, Inc., Raleigh, NC (US)

(72) Inventor: Christopher Edwin Morgan, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,206

(22) Filed: Jul. 10, 2014

(65) Prior Publication Data

US 2014/0325061 A1    Oct. 30, 2014

Related U.S. Application Data

(63) Continuation of application No. 13/149,235, filed on May 31, 2011, now Pat. No. 8,782,192.

(51) Int. Cl.
*G06F 15/173* (2006.01)
*H04L 12/26* (2006.01)
*H04L 12/00* (2006.01)
*G06F 11/30* (2006.01)

(52) U.S. Cl.
CPC ........ *H04L 43/0876* (2013.01); *G06F 11/3006* (2013.01); *H04L 12/00* (2013.01)

(58) Field of Classification Search
None
See application file for complete search history.

(56) References Cited

U.S. PATENT DOCUMENTS

| 6,463,457 | B1 | 10/2002 | Armentrout et al. |
| 7,313,796 | B2 | 12/2007 | Hamilton et al. |
| 7,439,937 | B2 | 10/2008 | Ben-Shachar et al. |
| 7,529,785 | B1 | 5/2009 | Spertus et al. |
| 7,546,462 | B2 | 6/2009 | Upton |
| 7,596,620 | B1 | 9/2009 | Colton et al. |
| 2001/0039497 | A1 | 11/2001 | Hubbard |
| 2002/0069276 | A1 | 6/2002 | Hino et al. |
| 2002/0165819 | A1 | 11/2002 | McKnight et al. |
| 2003/0037258 | A1 | 2/2003 | Koren |

(Continued)

OTHER PUBLICATIONS

"rBuilder and the rPath Appliance Platform", 2007 rPath, Inc. www.rpath.com, 3 pgs.

(Continued)

*Primary Examiner* — Mohamed Wasel
*Assistant Examiner* — Tsung Wu
(74) *Attorney, Agent, or Firm* — Lowenstein Sandler LLP

(57) ABSTRACT

A processor accesses usage history data, which includes subscription events for a virtual machine, and generates translatable time periods to which the subscription events can be assigned. Each of the translatable time periods is temporally shifted and each of the subscription events is assigned to one or more translatable time periods. The processor generates translation outcomes for a user of the virtual machine for the translatable time periods in view of assigned subscription events. The translation outcomes include an identified change in subscription costs of the user over the translatable time periods. The processor identifies a translated base period from the translatable time periods for which the subscription parameters will be applied to the usage history data in view of applying selection criteria to the translation outcomes and tracks resource usage of the user in view of the identified translated base period to determine an alternate set of subscription costs.

20 Claims, 9 Drawing Sheets

(56) References Cited

U.S. PATENT DOCUMENTS

| | | |
|---|---|---|
| 2003/0110252 A1 | 6/2003 | Yang-Huffman |
| 2003/0135609 A1 | 7/2003 | Carlson et al. |
| 2003/0177176 A1 | 9/2003 | Hirschfeld et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2007/0299721 A1* | 12/2007 | Robinson et al. ............... 705/13 |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhardt et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala |
| 2009/0276771 A1* | 11/2009 | Nickolov et al. ............. 717/177 |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | DeHaan et al. |
| 2010/0306765 A1 | 12/2010 | DeHaan |
| 2010/0306767 A1 | 12/2010 | DeHaan |
| 2011/0016214 A1 | 1/2011 | Jackson |
| 2011/0055034 A1 | 3/2011 | Ferris et al. |
| 2011/0055377 A1 | 3/2011 | DeHaan |
| 2011/0055378 A1 | 3/2011 | Ferris et al. |
| 2011/0055396 A1 | 3/2011 | DeHaan |
| 2011/0055398 A1 | 3/2011 | DeHaan et al. |
| 2011/0055588 A1 | 3/2011 | DeHaan |
| 2011/0107103 A1 | 5/2011 | DeHaan et al. |
| 2011/0131134 A1 | 6/2011 | Ferris et al. |
| 2011/0131306 A1 | 6/2011 | Ferris et al. |
| 2011/0131315 A1 | 6/2011 | Ferris et al. |
| 2011/0131316 A1 | 6/2011 | Ferris et al. |
| 2011/0131335 A1 | 6/2011 | Spaltro et al. |
| 2011/0131499 A1 | 6/2011 | Ferris et al. |
| 2012/0165412 A1 | 7/2011 | Morgan |
| 2011/0213686 A1 | 9/2011 | Ferris et al. |
| 2011/0213687 A1 | 9/2011 | Ferris et al. |
| 2011/0213691 A1 | 9/2011 | Ferris et al. |
| 2011/0213713 A1 | 9/2011 | Ferris et al. |
| 2011/0213719 A1 | 9/2011 | Ferris et al. |
| 2011/0213875 A1 | 9/2011 | Ferris et al. |
| 2011/0213884 A1 | 9/2011 | Ferris et al. |
| 2011/0214124 A1 | 9/2011 | Ferris et al. |
| 2011/0295727 A1 | 12/2011 | Ferris et al. |
| 2011/0295986 A1 | 12/2011 | Ferris et al. |
| 2011/0295998 A1 | 12/2011 | Ferris et al. |
| 2011/0295999 A1 | 12/2011 | Ferris et al. |
| 2011/0296000 A1 | 12/2011 | Ferris et al. |
| 2011/0296019 A1 | 12/2011 | Ferris et al. |
| 2011/0296022 A1 | 12/2011 | Ferris et al. |
| 2011/0296023 A1 | 12/2011 | Ferris et al. |
| 2011/0296370 A1 | 12/2011 | Ferris et al. |
| 2011/0313902 A1 | 12/2011 | Liu et al. |
| 2012/0130873 A1 | 5/2012 | Morgan |
| 2012/0131161 A1 | 5/2012 | Ferris et al. |
| 2012/0131173 A1 | 5/2012 | Ferris et al. |
| 2012/0131174 A1 | 5/2012 | Ferris et al. |
| 2012/0131176 A1 | 5/2012 | Ferris et al. |
| 2012/0131193 A1 | 5/2012 | Ferris et al. |
| 2012/0131194 A1 | 5/2012 | Morgan |
| 2012/0131195 A1 | 5/2012 | Morgan |
| 2012/0136989 A1 | 5/2012 | Ferris et al. |
| 2012/0137001 A1 | 5/2012 | Ferris et al. |
| 2012/0137002 A1 | 5/2012 | Ferris et al. |
| 2012/0137003 A1 | 5/2012 | Ferris et al. |
| 2012/0221454 A1 | 8/2012 | Morgan |
| 2012/0226796 A1 | 9/2012 | Morgan |
| 2012/0226808 A1 | 9/2012 | Morgan |
| 2012/0304170 A1 | 11/2012 | Morgan |
| 2012/0304191 A1 | 11/2012 | Morgan |
| 2012/0311106 A1 | 12/2012 | Morgan |
| 2012/0311154 A1 | 12/2012 | Morgan |
| 2012/0311571 A1 | 12/2012 | Morgan |

OTHER PUBLICATIONS

White Paper-"rPath Versus Other Software Appliance Approaches", Mar. 2008, rPath, Inc. www.rpath.com, 9pgs.

White Paper-"Best Practices for Building Virtual Appliances", 2008, rPath, Inc. www.rPath.com, 6 pgs.

\* cited by examiner

DETECTING RESOURCE CONSUMPTION EVENTS OVER SLIDING INTERVALS IN CLOUD-BASED NETWORK

RELATED APPLICATIONS

This patent application is a continuation of U.S. patent application Ser. No. 13/149,235 filed May 31, 2011, the entire contents of which are hereby incorporated by reference herein.

TECHNICAL FIELD

The present disclosure relates to detecting resource consumption events over sliding intervals in cloud-based network, and more particularly, to platforms and techniques for generating translatable or shiftable time periods for the evaluation of resource consumption by virtual machines in a cloud-based network.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the administrative capture of a user's resource consumption history and the metering, billing, and other subscription consequences that result from recording that information, in conventional cloud platforms or other virtual platforms, the consumption periods or intervals over which user activity may be tracked may be set or configured at fixed or regular intervals, such as fifteen minutes or one hour periods. Moreover, in conventional systems, those intervals may be configured or set to start at default time points, such as every hour on the hour or others, and those intervals may not be adjusted or offset. In such situations and others, a user whose resource consumption history demonstrates bursty activity that crosses or straddles those default intervals may therefore not be assessed any over-consumption fees or receive any other subscription consequences, even if the consumption or other events would exceed subscription limits if the time periods were aligned to start at different time points.

It may be desirable to provide systems and methods for detecting resource consumption events over sliding intervals in cloud-based network, in which an administrator and/or other user can select or configure the time periods for a user's consumption tracking to be translated or shifted to different starting and ending time points, and consequently produce different groupings of consumption events depending on how the time periods are translated.

DETAILED DESCRIPTION

Figure 1:
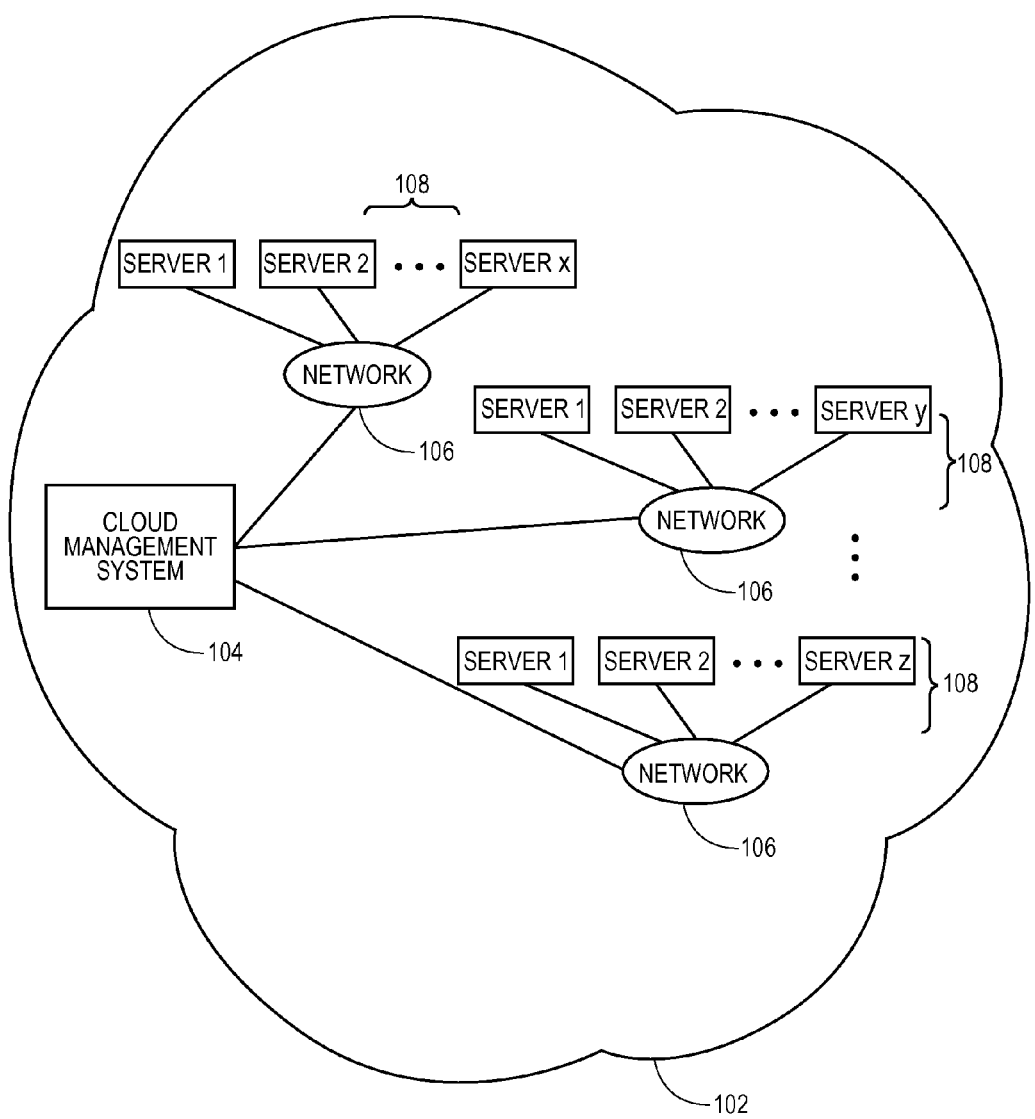
FIG. 1 illustrates an overall cloud system architecture in which various aspects of systems and methods for detecting resource consumption events over sliding intervals in cloud-based network can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines.

The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
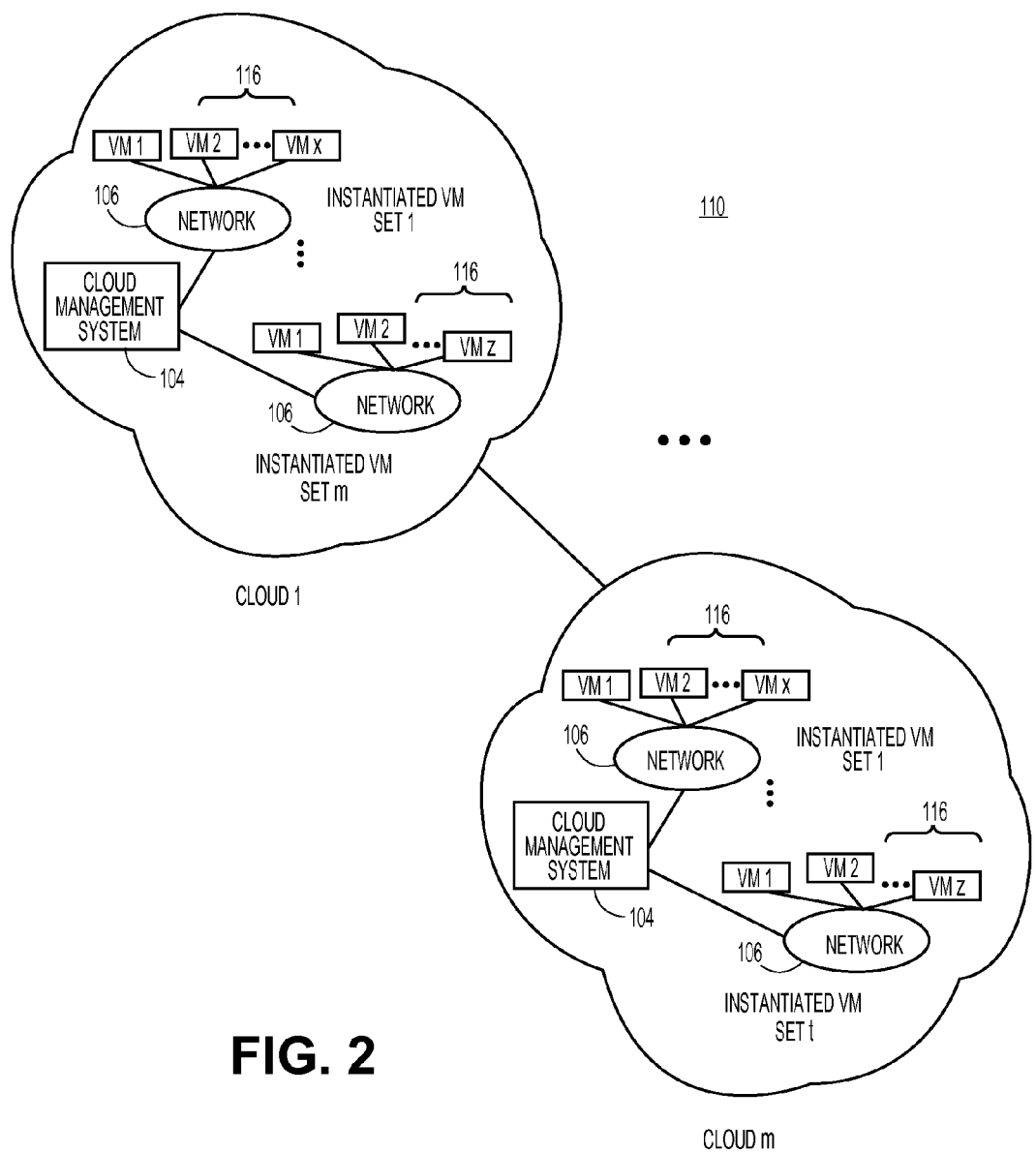
FIG. 2 illustrates an overall cloud system architecture in which various aspects of systems and methods for detecting resource consumption events over sliding intervals in cloud-based network can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/ processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Aspects of the present teachings relate to platforms and techniques in which the tracking of an event chronology reflected in a user's set of usage history data based on a set of translatable or "slidable" time periods. That is, according to aspects, there may be situations where it is advantageous to the user of a set of virtual machines, to the provider of a cloud supporting or hosting the set of virtual machines, and/or other entities to be able to track and organize usage histories and subscription events and/or other events or conditions according to time periods whose start point and end point can be translated or adjusted, to more accurately and/or differently account for the subscription effects or outcomes of those events. Thus for instance, according to aspects, a user's set of subscription parameters may specify that over-consumption of processor or memory resources will constitute a chargeable event, if for instance more than three such events occur in a given one-hour interval. In aspects, it could be the case that a user displays four or five processor or other consumption "spikes" above subscription limits in a row, but if three of those consumption peaks take place near the end of the fixed one-hour consumption interval while one or two others follow closely in a succeeding one-hour interval, the user's consumption behavior may not be accurately captured or reflected in any billing or other outputs. The ability of a schedule engine and/or other logic to translate or shift those time periods to a point or position where billing or other subscription effects more faithfully reflect the actual consumption behavior can therefore enhance management and other operations for the set of virtual machines and/or support cloud(s).

Figure 3:
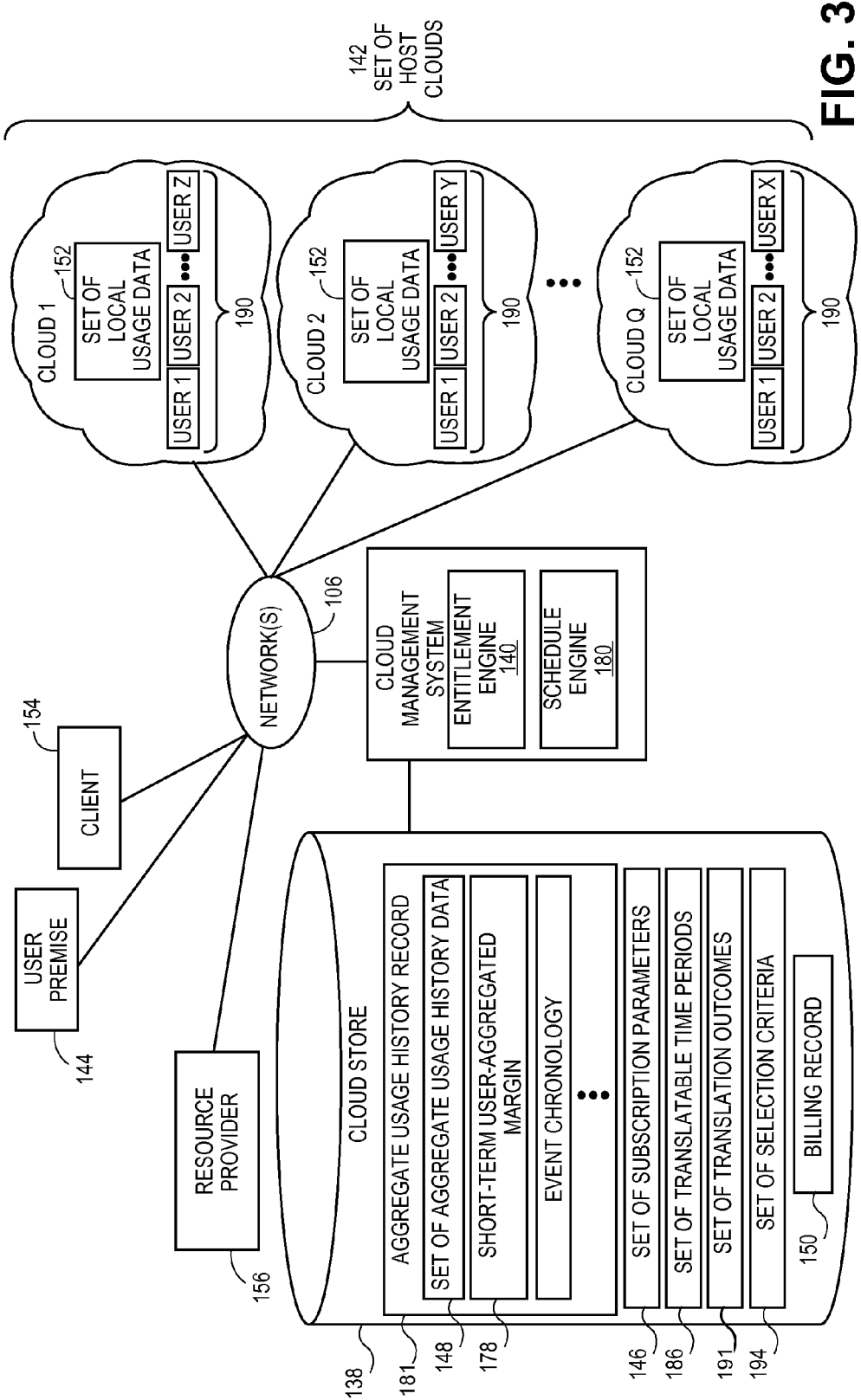
FIG. 3 illustrates a network configuration in which systems and methods for detecting resource consumption events over sliding intervals in cloud-based network can be implemented, including the capture and reconciliation of short-term resource consumption margins across a set of multiple users, and potentially across multiple host clouds.

Consistent with the foregoing, in general, FIG. 3 shows an illustrative network configuration in which systems and methods for detecting resource consumption events over sliding intervals in cloud-based network can be implemented, according to various embodiments. In embodiments as shown, one or more users can operate a user premise 144, such as a local area network with a set of servers and client machines, and/or other machines or resources. In aspects, a set of users 190 can in addition or instead operate one or more sets of virtual machines, appliances, and/or other virtual entities (not shown) in a set of host clouds 142. In aspects, the set of users 190 can be or include a collection of sub-groups of users who are each affiliated with or a part of the same entity, such as a corporation, government entity, and/or other organization. In aspects, the corporation and/or other collective entity can establish overall subscription parameters to which its users are entitled on a collective basis. In cases, the individual teams or users may not be aware or have a mechanism by which to track overall resource consumption on a collective basis, for instance to maintain service or resource level limits.

According to aspects, systems and methods according to the present teachings can permit. In aspects, the set of host clouds 142 hosting the set of users 190 can include a set of diverse and/or otherwise unrelated cloud-based networks to which the set of users 190 can subscribe for various resources under various subscription terms, limits, criteria, service level agreements, and/or other conditions, which can be recorded or reflected in a set of subscription parameters 146. The set of subscription parameters 146 can for instance be stored in the cloud store 138 hosted or accessed by a cloud management system 104, and/or in other storage resources or locations.

In embodiments as shown, an administrator and/or other user can operate a client 154 or other interface or terminal, for instance a client located in or communicating with the user premise 144 to access the set of subscription parameters 146 and other information related to the consumption of resources in the set of host clouds 142 by the set of users 190. In aspects, the consumption of resources in the set of host clouds 142 and generation of related billing events and other subscription-related activities can be tracked and managed by an entitlement engine 140, which can be hosted in the cloud management system 104 and/or in other locations, resources, or services. According to aspects, the entitlement engine 140 can communicate with a one or more resource providers 156, such as the vendors of software such as operating systems, applications, utilities, and/or other programs, services, and/or related resources. The one or more resource providers 156 can maintain part or all of the terms, conditions, limits, criteria, stipulations, and/or other parameters of the subscription of the set of users 190 to one or more resources hosted or provisioned in the set of host clouds 142, and for instance reflected in the set of subscription parameters 146.

In aspects, each host cloud in the set of host clouds 142 can capture and store a set of local usage data 152. The set of local usage data 152 can record the consumption or use of resources in a local host cloud in the set of host clouds 142, such as the number of instances of software including operating systems and applications, processor resources, memory resources, communications resources, storage resources, and/or other elements or resources. The set of local usage data 152 can include usage data for one, some, and/or all of the set of users 190 operating virtual machines or otherwise consuming resources in each particular host cloud. The entitlement engine 140 can periodically receive the set of local usage data 152 and/or updates to that information from one or more host clouds in the set of host clouds 142. The receipt of the set of local usage data 152 or any portion of the set of local usage data 152 can be performed in aspects on a pull or demand basis, where the entitlement engine 140 and/or other logic can issue commands or instructions to one or more host clouds in the set of host clouds 142, and receive that data back from the interrogated cloud or clouds. In aspects, the set of local usage data 152 can be transmitted to the entitlement engine 140 on a push basis, for instance, on a scheduled, predetermined, event-triggered, and/or other basis initiated by one or more of the host clouds in set of host clouds 142, themselves. Other channels, schedules, and techniques for the collection of the set of local usage data 152 from any one or more of the set of host clouds 142 can be used.

After receipt of the set of local usage data 152, any portion or component of the set of local usage data 152, and/or updates to the same, the entitlement engine 140 can collect and aggregate the set of local usage data 152 from the various host clouds and organize that data in a set of aggregate usage history data 148. The set of aggregate usage history data 148 can reflect recent and/or accumulated usage consumption by the set of users 190 user in all of the set of host clouds 142, over comparatively short-term periods or intervals such as minutes, one or more hours, one day, a number of days, a week, a month or months, and/or other intervals or periods. In aspects, the entitlement engine 140 can collect the set of local usage data 152 regardless of whether each of those clouds is configured to communicate with each other or not. In aspects, the set of aggregate usage history data 148 can present to the entitlement engine 140 and/or other logic the combined resource consumption by the set of users 190 across the user premise 144 and/or all operating virtual machines or entities, on an hour-by-hour, day-by-day, and/or other relatively short-term basis.

According to aspects, the entitlement engine 140 can thereby identify comparatively short-term resource consumption by the virtual machines or other entities, sites or nodes operated by the set of users 190, and capture and track that consumption compared to the short-term limits, levels, or caps that may be contained in the set of subscription parameters 146 for that user. The entitlement engine 140 can therefore generate or determine a short-term consumption margin for each resource which the set of users 190 consume and/or subscribe to in each cloud in the set of host clouds 142, indicating whether over the course of an hour or other period the consumption rates or values are over the subscription limit for a given resource, under the subscription limit, or at or nearly at the subscription limit for that resource.

Both the over and under-consumption margins for each resource can be captured and calculated, from which the entitlement engine 140 can generate a set of short-term user-aggregated margins 178 representing the collective short-term consumption of that resource across the diverse host clouds in set of host clouds 142, resulting in an offset or aggregate consumption value. Deviations from short-term consumption caps, limits, service level agreements (SLAs), and/or other criteria can therefore be combined, averaged, aggregated, and/or otherwise "smoothed out" to more accurately and/or timely reflect the consumption patterns of the set of users 190, as a whole on an aggregate basis. In aspects, the resource provider 156, the cloud operators or providers of the set of host clouds 142, and/or other entities can thereby charge, bill, or otherwise adjust the subscription costs or other factors encoded in the billing record 150 sent to the set of users 190, for instance via an administrator or other users, so that their subscription obligations more closely track the actual consumption behavior demonstrated by the set of users 190. In aspects, the set of short-term user-aggregated margins 178 can for instance be used to establish short-term marginal subscription costs based on short-term deviations from any subscription consumption limits, which costs can then be combined over different time periods to further average or aggregate the deviations in resource consumption. In aspects, the detection of bursts and relaxations in resource consumption over relatively short-term periods can thereby allow both positive and negative offsets or margins in subscription costs, creating a more accurate assignment of subscription rates.

In implementations as shown, after detecting the set of short-term user-aggregated margins 178 for each resource of interest, the entitlement engine 140 can generate a billing record 150 reflecting that event, for purposes of notification to the user and collection of billing amounts or other responses. In aspects, the entitlement engine 140 can transmit or forward the billing record 150 to the resource provider 156, such as a software vendor, to produce and transmit to the user under agreed billing arrangements. In aspects, the entitlement engine 140 can transmit or forward the billing record 150 to one or more host clouds in set of host clouds 142, including those in which an over-limit resource usage or other event took place, to potentially transmit to the set of users 190 and/or other recipient for similar purposes. In aspects, the resource provider 156 and one or more cloud operators or cloud providers of the set of host clouds 142 can maintain agreements or arrangements for the capture and forwarding of the billing record 150, and the collection of any billing amounts or credits paid by the user. In aspects, the resource provider 156 and the host cloud providers or operators can establish arrangements to share or distribute any overage payments or other payments or credits received from users between themselves. According to aspects, the monitoring and billing capture of short or long-term over-limit resource consumption can therefore be conducted, on a marginal offset or other basis, even in instances where each host cloud in set of host clouds 142 is not aware of subscription limits contained in the set of subscription parameters 146, and/or the local usage data 152 of one or more of the set of host clouds 142 is not visible to other host clouds and/or all groups or sub-groups of users within the set of users 190, and/or to other participants in the cloud-based network.

In implementations, the operator or operators of the set of host clouds 142, the one or more users in the set of users 190, and/or other users or entities, may wish to modify or enhance billing, metering, scheduling, and/or other operations by the introduction of non-fixed and/or translatable time periods. In aspects as shown, the cloud management system 102 supporting a set of host clouds 142 can host, incorporate, and/or access a schedule engine 180, and use the schedule engine 180 and/or other logic, application, and/or service to build, maintain, access, and update a set of translatable time periods 186 with which to analyze an event chronology 196 for the resource consumption record(s) of the virtual machines of one or more users. The schedule engine 180 and/or other logic, application, and/or service can generate a set of translation outcomes 191 which are produced by introducing and analyzing the set of translatable time periods 186 to determine the billing, metering, scheduling, and/or other effects that would be produced by shifting or changing the time period to which the user's event chronology 196 is assigned. In aspects, the shifting of subscription measurement and/or other time periods can be cycled through an entire set of usage history and/or set of translatable time periods 186, recording the effects of those shifts one after the other. In embodiments as shown, the set of translation outcomes 191 can thereby reflect the collective or aggregate set of possible alternative billing and/or other subscription effects caused by using those alternative time frames or periods to measure or assess the user's event chronology 196, including resource consumption events. A translated base period can then be determine or selected based on the set of translation outcomes 191, by applying a set of selection criteria 194 to the set of translation outcomes 191 to identify desired billing, metering, scheduling, and/or other ranges or outputs created by choosing an identified translated based period, as described herein.

Figure 4:
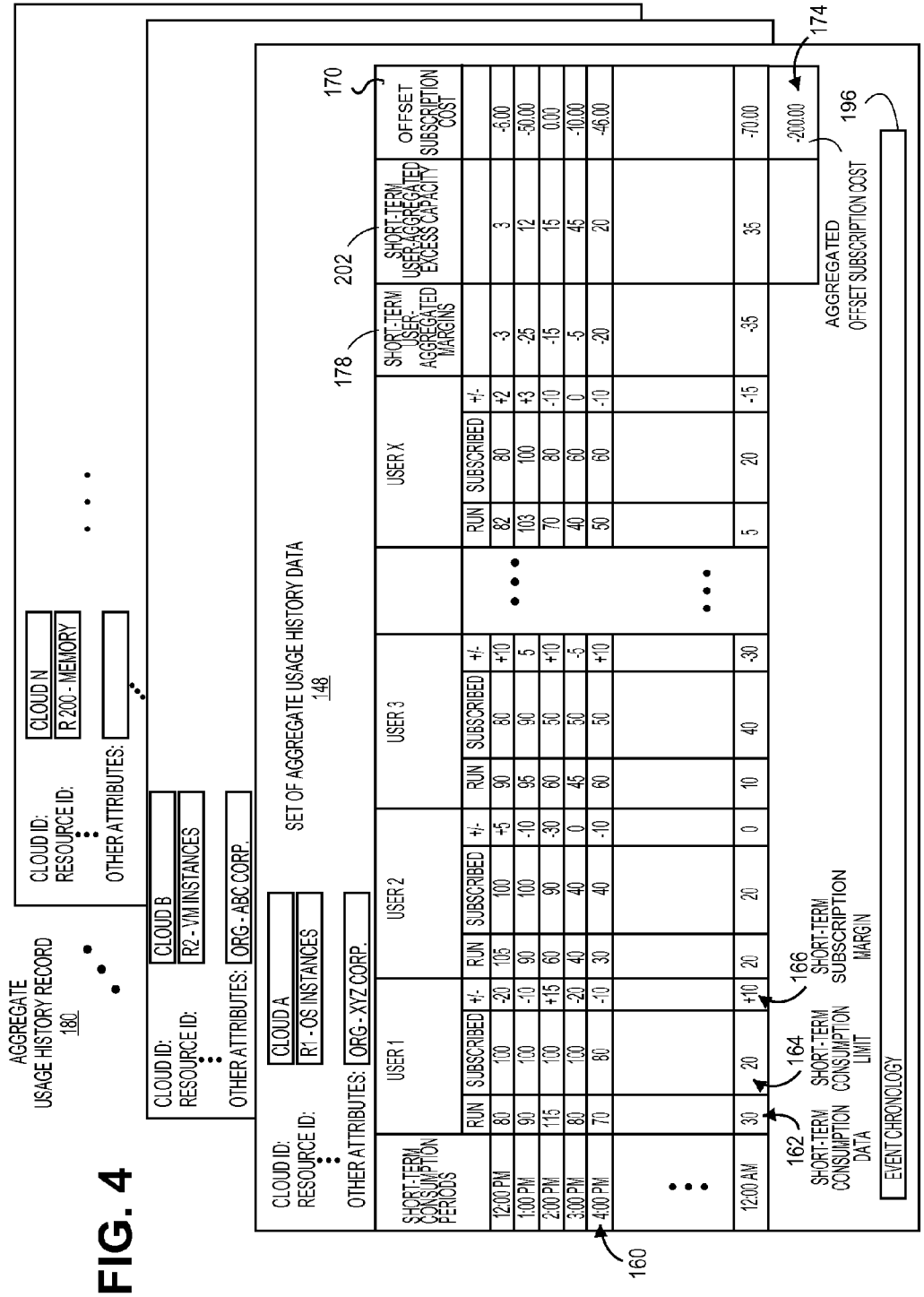
FIG. 4 illustrates an exemplary data structure in which the capture and aggregation of marginal resource consumption data for multiple users, and available excess capacity from those users can be encoded and stored, according to various aspects.

In terms of data capture of the usage, subscription, billing and related information used to detect and record resource consumption, excess resource capacity flows, one or more event chronologies 192, and/or other information and/or other events, FIG. 4 illustrates an aggregate usage history record 181 that can be used to store the set of aggregate usage history data 148 which can store and encode various data, attributes, criteria, and/or other information used to track and manage the differential or marginal resource consumption in the set of host clouds 142 and/or other host sites by the set of users 190. In aspects, the aggregate usage history record 181 can be encoded as a relational or other database, table, tree, file, object, and/or other data store or data structure. In aspects as shown, the set of aggregate usage history data 148 encoded and stored in the aggregate usage history record 181 can include tables, entries, values, attributes, and/or other information including set of short-term consumption data 162 reflecting the usage of one or more resources in the set of host clouds 142 by each user in the set of users 190 over one or more short-term consumption periods 160. In aspects, the one or more short-term consumption periods 160 can be or include a variety of periods or intervals, such as one-hour intervals (as shown), but can also be or include other periods or intervals, such as 1, 5, 10, 15, and/or 30 minutes, 2 hours, 8 hours, 12 hours, one day or 24 hours, 3 days, one week, and/or other time intervals or periods. In aspects, the one or more short-term consumption periods 160 can reflect a period or interval (or periods or intervals) that is/are shorter than the period called for in the set of subscription parameters 146 as the basic or defined interval in terms of resource consumption limits or levels, service level agreements (SLAs), and/or other subscription criteria or settings. In aspects, the short-term subscription period 160 can be defined to be equal to the subscription period(s) or interval(s) defined by the set of subscription parameters 146. In aspects, the value, length, or short-term nature of the one or more short-term consumption periods 160 can be configured as dynamic, flexible, or configurable units, rather than defined as a strict number of minutes, hours, days, and/or weeks or other units. In aspects, the short-term subscription period 160 can be set or configured by a user, such as the cloud provider(s) or cloud operator(s) of the set of host clouds 142, by the one or more resource providers 156, by the set of users 190 whose set of aggregate usage history data 148 is being track and administered, and/or by other users or entities. In aspects, a record can be kept in the aggregate usage history record 181 recording, for each cloud in the set of host clouds 142 in which the set of users 190 subscribes and/or uses or consumes resources, the short-term consumption data 162 indicating an amount, rate, or other metric of resource consumption over each of the one or more short-term consumption periods 160.

In aspects as shown, the aggregate usage history record 181 can likewise include, for each cloud in the set of host clouds 142 and each resource consumed or used in that cloud, the short-term consumption limit 164 for that user based on the set of subscription parameters 146 and/or other information for each user in the set of users 190. In aspects, the entitlement engine 140 and/or other logic can generate and store a short-term subscription margin 166 reflecting the deviation in terms of under-consumption or over-consumption of each resource for which each user in the set of users 190 has a short-term consumption limit 164. The short-term subscription margin 166 can thereby reflect, on a comparatively short-term basis, such as every 15 or 30 minutes, hour, 8 hour, one-day or other period, the marginal amount by which the consumption of a subscribed resource by the set of users 190 is fluctuating and possibly deviating from the short-term consumption limit 164. In aspects, the short-term subscription margin 166 can reflect a negative value, indicating that a lesser amount of one or more resource is being consumed or has been consumed compared to limits or levels in the set of subscription parameters 146. In aspects, the short-term subscription margin 166 can reflect a positive value, indicating that a greater amount of one or more resource is being consumed or has been consumed compared to limits or levels in the set of subscription parameters 146.

In aspects, the entitlement engine 140 and/or other logic can similarly collect and sum or aggregate the short-term subscription margin 166 over each host cloud in the set of host clouds 142 in which the set of users 190 is using or consuming the subject resource to generate a set of short-term user-aggregated margins 178, representing the comparatively short-term or immediate net consumption of the resource over the set of users 190. In aspects, the set of short-term user-aggregated margins 178 can also be aggregated over two or more clouds of the set of host clouds 142. The set of short-term user-aggregated margins 178 can be calculated and stored for each hour and/or other period represented by the one or more short-term consumption periods 160, for instance over the course of one hour, day, one week, one month, and/or other period or interval. In aspects as shown, the entitlement engine 140 and/or other logic or service can further calculate and store an aggregate consumption total over a defined period, such as a one-day or other period, summing or aggregating the set of short-term user-aggregated margins 178 for a resource for one user over that period. In aspects, the aggregate consumption total can thereby encode the combined, net, averaged, and/or otherwise aggregated effect of the various under and over-limit consumption events by the set of users 190 in the set of host clouds 142 over 12 hours, 24 hours, and/or other predetermined interval. The entitlement engine 140 and/or other logic can, in addition, also calculate and store a set of offset subscription costs 170 reflecting the costs, surcharges, credits, and/or other adjustments for each hour and/or other period in the one or more short-term consumption periods 160 for a particular resource across the set of users 190. A resource provider, cloud operator, and/or other entity may be entitled, for instance, to an overage subscription fee or charge at a rate of $0.50 per instance for operating system (OS) instances over the short-term consumption limit 164 based on that usage, and/or other adjustments or factors. In aspects, the set of offset subscription costs 170 can be computed at a fixed rate, and/or at a dynamically adjusted rate, for instance based on time of usage, total resource consumption, and/or other parameters. The entitlement engine 140 and/or other service or logic can also generate an aggregate offset subscription cost 174 which combines or sums the set of offset subscription costs 170 for each of the one or more short-term consumption periods 160 for a predetermined period, such as one day, one week, one month, and/or other period or interval, across the set of users 190. The aggregate offset subscription cost 174, and other consumption variables and cost factors, can in aspects thereby more accurately correspond to the overall rate or absolute amount of resource consumption in the set of host clouds 142 by the set of users 190. In embodiments, the entitlement engine 140 and/or other logic can in addition combine, sum, and/or otherwise aggregate or net the aggregate offset subscription cost 174 for multiple individual resources whose consumption data in turn has been aggregated across multiple host clouds in the corresponding aggregate offset subscription cost 174, to generate a total offset subscription cost. In aspects, the total offset subscription cost can encapsulate the net marginal resource usage by the set of users 190 against all short-term consumption limits 164 with associated costs or credits across all host clouds in the set of host clouds 142, all subscribed resources, and/or all daily or other operative time periods constructed from the one or more short-term consumption periods 160.

In aspects and as likewise shown in FIG. 4, the entitlement engine 140 and/or other logic or service can also capture, identify, and/or record an event chronology 196 for one or more users, based on some or all of the foregoing consumption information, and/or other information or data. In aspects, the translated base period 192 can be derived and/or extracted from the set of aggregate usage history data 148 including tracked consumption records, and/or other data or sources. In aspects, the schedule engine 180 and/or other logic, application, and/or service can scan or probe the effects of shifting or translating the set of translatable time periods 186 across multiple time intervals, to determine the effects of assigning the user's event chronology 196 and/or associated subscription events, and/or other consumption or other records, conditions, and/or events, to different periods or intervals. In aspects, the set of translatable time periods 186 can in one regard exhaustively probe the translated base period 192 by "bracketing" the translated base period 192 over successive time intervals from a first time point to a last time point available or reflected in the set of aggregate usage history data. In other aspects, each time period in the set of translatable time periods 186 can be configured or aligned to begin on the time point or timestamp of a first event in the event chronology 196. Other configurations of the set of translatable time periods 186 can be used.

Figure 5A:
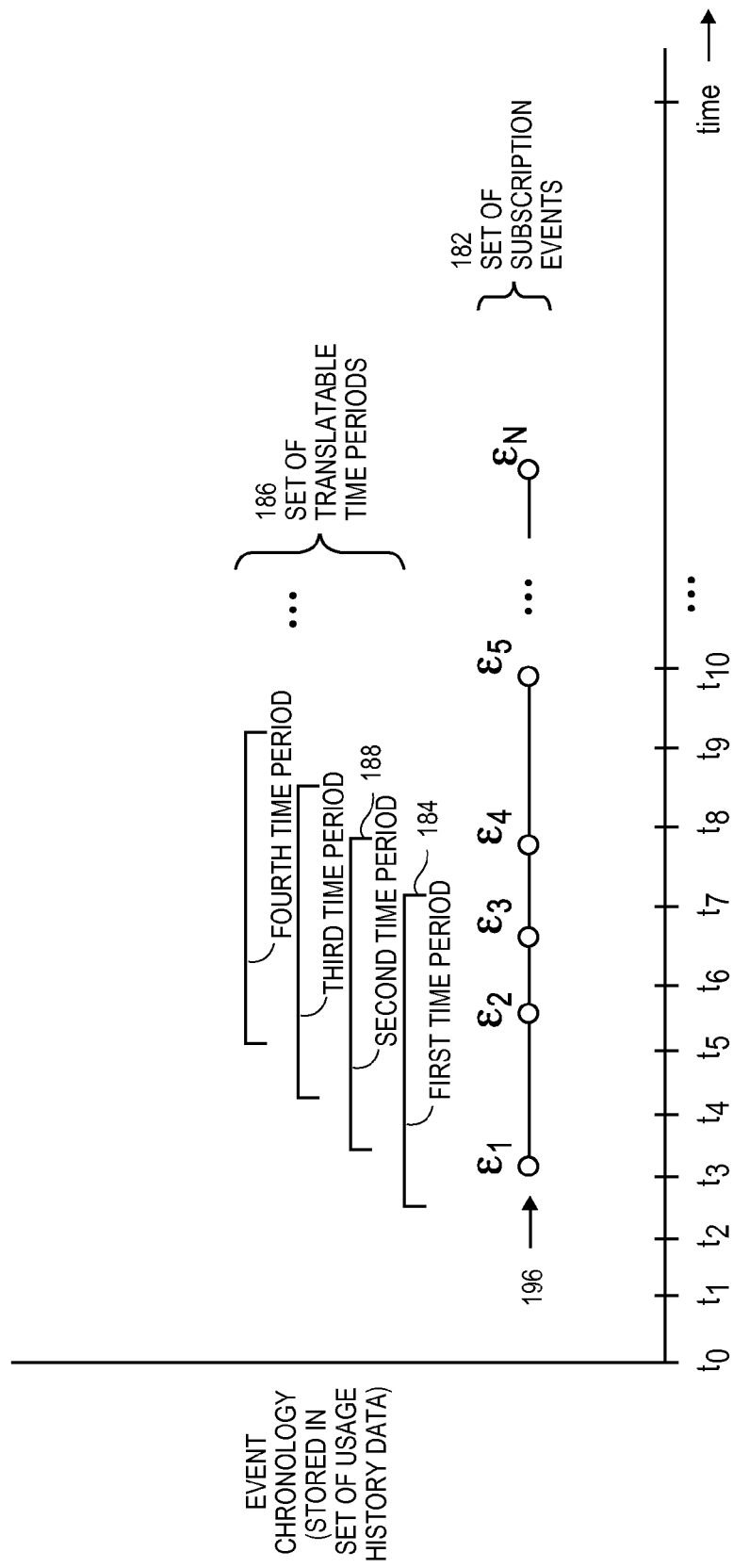
FIGS. 5A and 5B illustrate an exemplary series of groupings of subscription events along a timeline having multiple translatable time periods, according to aspects.

According to those and related aspects of the present teachings, and as for example further shown in FIG. 5A, the schedule engine 180, entitlement engine 140, and/or other logic, application, and/or service can operate to generate, manipulate and configure the set of translatable time periods 186 to analyze the set of subscription events 182 derived from and/or contained in the event chronology 196 for a user or more than one user of the set of users 190 whose virtual machines and/or other services or processes are hosted in the set of host clouds 142. In aspects, the schedule engine 180, entitlement engine 140, and/or other logic, application, and/or service can generate the set of translatable time periods 186, each of which can span a regular, fixed, and/or predetermined interval, such as two, three, four, five, and/or other time increments, periods, and/or intervals. In aspects, the intervals can be or include intervals or seconds, minutes, hours, days, weeks, and/or other values, intervals, and/or durations. In aspects as shown, each time period in the set of translatable time periods 186 can be shifted or translated by one time "tick" or increment, but other shifts or translations can be used.

Figure 5B:
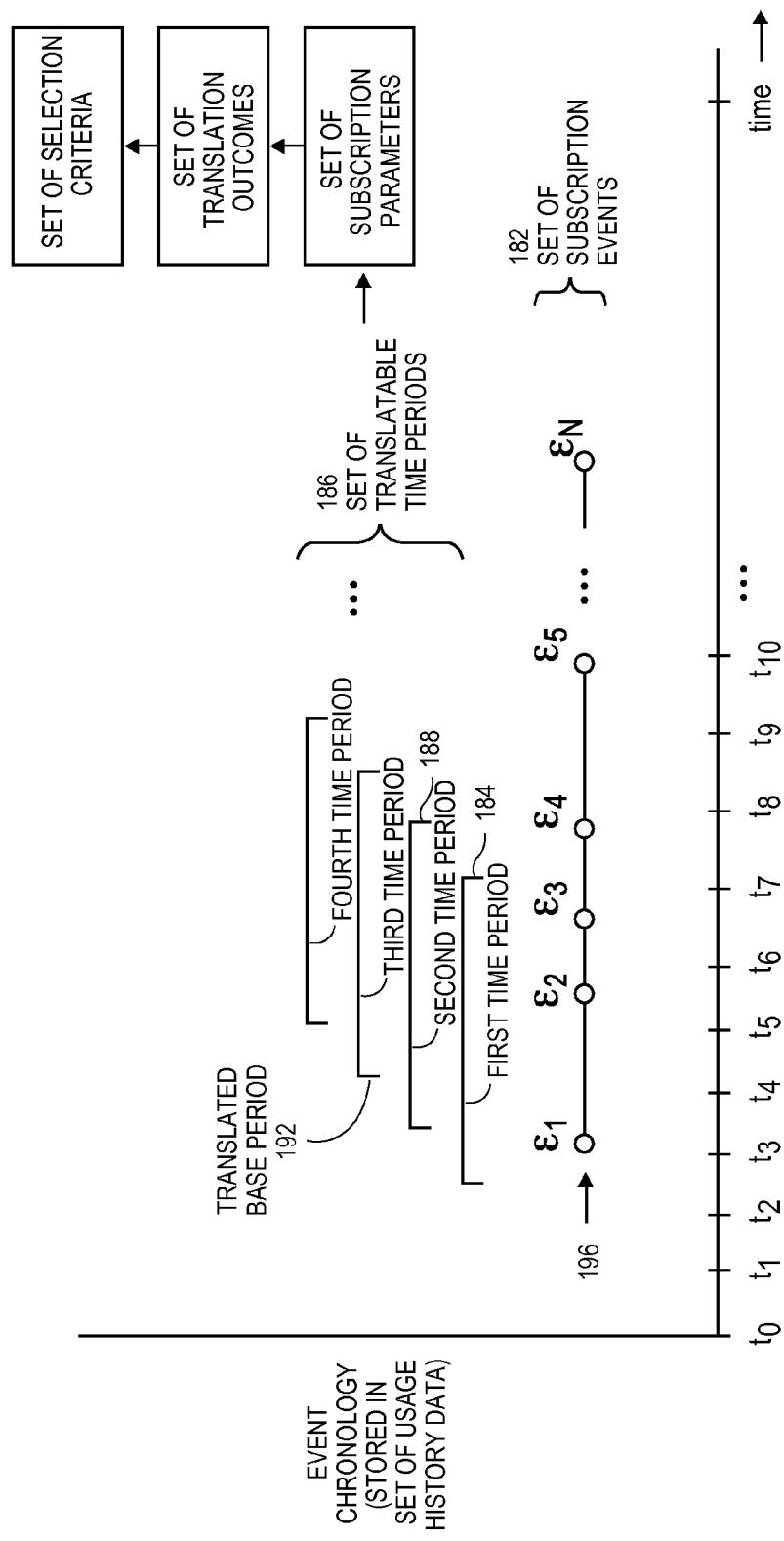

After generating the set of translatable time periods 186, and as for instance shown in FIG. 5B, the schedule engine 180, entitlement engine 140, and/or other logic, application, and/or service can generate a set of translation outcomes 191 that reflect the aggregate effects or results that arise from grouping the set of subscription events 182 according to each time period in the set of translatable time periods 186. In aspects, the set of translation outcomes 191 that are created by grouping the set of subscription events 186 according to each time period in the set of translatable time periods 186 can be generated and/or identified by analyzing the set of subscription parameters 146 against the set of translatable time periods 186 within each time period to determine, for instance, resource over-consumption events, resource under-consumption events, effects related to subscription costs, and/or other events, effects, and/or occurrences. After the development or generation of the set of translation outcomes 191, the schedule engine 180, entitlement engine 140, and/or other logic, application, and/or service can apply the set of selection criteria 194 to the set of translation outcomes 191, to identify and/or select the translated base period 192. In aspects, the set of selection criteria can be or include a set of rules, thresholds, functions, logical relationships, and/or other criteria that can be used to select a time period in the set of translatable time periods 186 for use as a base period to evaluate the user's set of subscription parameters 146 in relation to the set of subscription events 182 and/or other usage information. It may be noted that according to aspects, different service level agreements (SLAs) can be applied to different intervals or periods in the set of translatable time periods 186. Thus for example, in the interval or period of 9:00 a.m. to 5:00 p.m. Eastern standard time, an event trigger or marker in the event chronology 196 and/or other record can be 3 processor overages or other events per hour, while the same event trigger can be changed to 5 processor overages or other events per hour during weekend or holiday times. Other events, triggers, and periods can be used, and again different levels specified in SLAs or other subscription parameters can be applied to or over different periods, and/or to the same subscription period (s) based on changing consumption conditions and/or other triggers or parameters.

Merely for example, each short-term consumption margin for a consumed resource that is positive (either aggregate across clouds or within a singular cloud), can be treated as a t0 to create a true sliding consumption period. Additionally, a rule can be set that states if there is a consumption overage (positive) after X number of short-term consumption margin events E{0 . . . n} after Y consumption period, it is only then that the schedule engine 180 and/or other logic would be concerned with collecting a subscription cost. So, for example, if a consumption period Y is defined to be 15 minutes, and there is a positive short-term consumption margin event E0, then the system can start the clock for the Y period and wait to see if X number short-term consumption margin events are recognized. If X=3, and E1 arrives at minute 9, and E2 arrives at minute 12, then the system can collect cost. However, if X=3, and E1 arrives at minute 9, and E2 arrives at minute 16, then the system does not collect any cost. It may be noted that each event can restart a timer with respect to its occurrence. So in the noted instance, E0 at t0 does not cause a collection event with E1 at 9 and E2 at minute 16. However, if E3 arrived at 17, then there will be a collection event relative to E1 (because X=3 and Y=15). Other rules, calculations, and/or outputs can be used.

Figure 6:
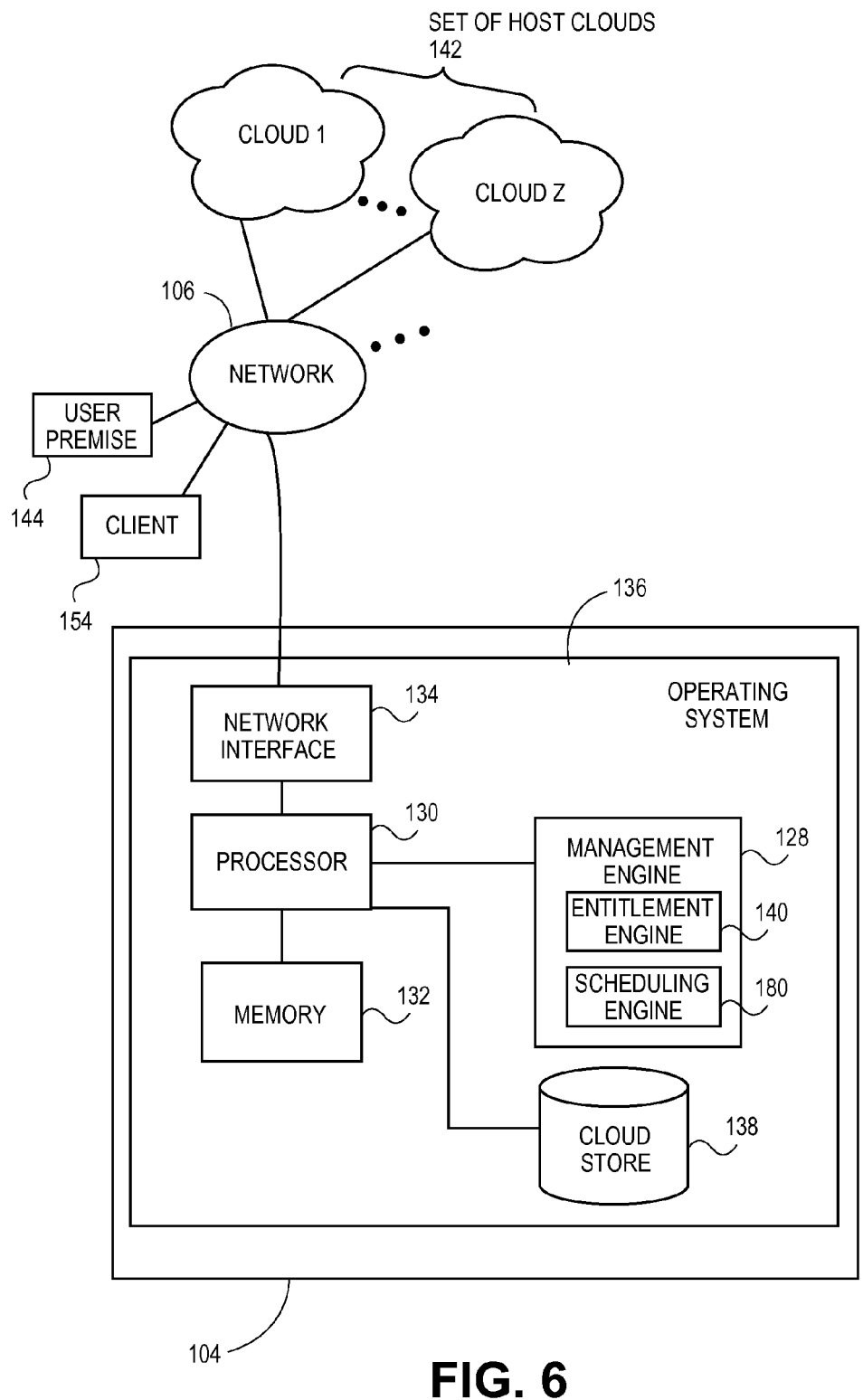
FIG. 6 illustrates an exemplary hardware configuration for a cloud management system and/or other hardware that can support and maintain one or more cloud-based networks, according to various embodiments.

FIG. 6 illustrates an exemplary diagram of hardware and other resources that can be incorporated in a cloud management system 104 configured to communicate with the set of instantiated virtual machines 116, entitlement engine 140, user premise 144, client 154, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with the entitlement engine 140, the schedule engine 180, the set of subscription parameters 146, the set of usage history data 148, the user premise 144, the client 154, the set of host clouds 142, and/or other interfaces, applications, machines, sites, services, data, and/or logic. Other configurations of the cloud management system 104, associated network connections, and other hardware, software, and service resources are possible. It may be noted that in embodiments, the client 154 and/or other hardware machines, platforms, or engines can comprise the same or similar resources as cloud management system 104, or can be configured with different hardware and software resources.

Figure 7:
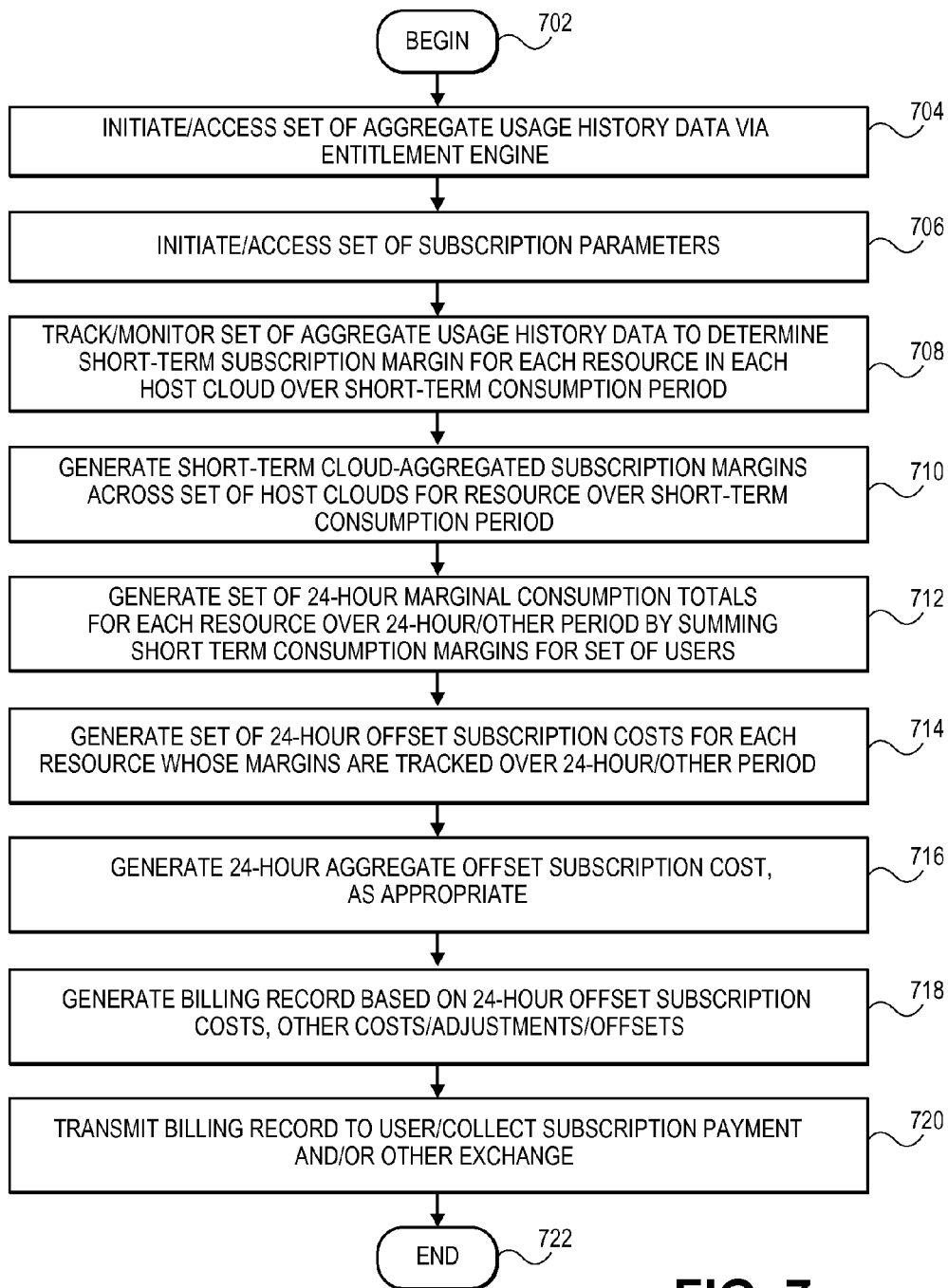
FIG. 7 illustrates a flowchart for the analysis and processing of short-term resource consumption by a set of users in different clouds, and the reconciliation of different marginal consumption values for those users including potentially across those clouds in an aggregate or offset subscription cost, that can be used in systems and methods for detecting resource consumption events over sliding intervals in cloud-based network according to various embodiments.

FIG. 7 illustrates a flowchart of overall processing to perform the tracking of resource consumption, management of subscription parameters, short-term billing capture and margin reconciliation and related activities, according to various embodiments of the present teachings. In 702, processing can begin. In 704, an administrator or other user can initiate and/or access the set of aggregate usage history data 148 for the set of users 190 and/or other user or users via the entitlement engine 140 and/or other logic. In 706, an administrator or other user can initiate and/or access the set of subscription parameters 146, indicating, for instance, resource consumption rates, limits, caps, and/or other subscription parameters or factors by which the set of users 190 can subscribe to resources of the set of host clouds 140. In 708, the entitlement engine 140 and/or other logic can track, register, and/or monitor the set of aggregate usage history data 148 to determine the short-term subscription margin 166 for each resource to which the set of users 190 subscribes, in each host cloud in set of host clouds 142 to which the user is registered. In aspects, the short-term subscription margin 166 can be tracked or monitored for each period in the one or more short-term consumption periods 160. In aspects, the one or more short-term subscription periods 160 can be or include one or more periods such as, for instance, one-hour periods as shown, and/or can also or instead include other periods such as periods or intervals of 1, 5, 10, 15, or 30 minutes, 8-hour periods, 12-hour periods, 24-hour periods, and/or other periods or intervals. In aspects, the one or more short-term consumption periods 160 can correspond to the short time periods tracked by the cloud management system, the entitlement engine 140, the set of host clouds 142, and/or other cloud logic or infrastructure. In aspects, the one or more short-term consumption periods 160 can comprise equally-spaced intervals, and/or can include intervals of different durations or lengths.

In 710, the entitlement engine 140 and/or other logic can sum the short-term subscription margin 166 across all users in the set of users 190 and/or all host clouds for each period of the one or more short-term consumption periods 160 to generate the short-term user-aggregated margin 178 for that respective period. For instance, in exemplary records as shown in FIG. 4, the number of operating system (OS) instances instantiated and/or run by the set of users 190 in a given hour across the set of host clouds 142 can be totaled, so that instances of under-limit consumption offset instances of over-limit consumption, resulting in a net short-term user-aggregated margin 178 for the one or more short-term consumption periods 160 across all users in set of users 190 for one or more all host clouds. In cases, the set of short-term user-aggregated margins 178 may reflect a net over-consumption (positive) value for that hour or other period (as illustratively shown), or can reflect an under-consumption (negative) value for that same period. A zero margin (at-limit) value can also be reflected.

In 712, the entitlement engine 140 and/or other logic can generate the set of marginal consumption totals 168 reflecting the total combined short-term subscription margin 166 for each resource being tracked over a 24-hour, or other interval or period. For example, and as shown for instance in FIG. 4, the under-limit (e.g. recorded as a negative value) and over-limit (e.g. recorded as a positive value) margins or increments of consumption under or over the short-term consumption limit 164 for each one or more short-term consumption periods 160 can be summed or combined to determine the set of short-term user-aggregated margins 178 for each respective resource over a 24-hour period, again for one or more host clouds. In aspects, other periods or intervals other than a 24-hour period can be used to sum the values reflected in the set of short-term user-aggregated margins 178. The values reflected in the set of short-term user-aggregated margins 178 can thereby reflect the netting out of the under-consumption and over-consumption values for a given resource in two or more dimensions, namely over multiple users and/or two or more host clouds, and over multiple instances of the one or more short-term consumption periods 160, averaging out consumption fluctuations by the set of users 190 in relation to the set of short-term consumption limits 164.

In 714, the entitlement engine 140 and/or other logic can generate the set of offset subscription costs 170 for each of the one or more short-term consumption periods 160 corresponding to the set of short-term user-aggregated margins 178 for each subscribed resource. For instance, if the record for a given one or more short-term consumption periods 160 reflects the over-consumption of 20 operating system instances, the assigned overage cost of that usage may be, for instance, $0.50 times 20 instances, or $10.00 for that hour or other period. In 716, the entitlement engine 140 and/or other logic can generate the aggregate offset subscription cost 174 for one 24-hour or other period, representing the combination of the set of offset subscription costs 170 over a multiple number of the one or more short-term consumption periods 160, such as the combination of 24 one-hour periods, or other intervals, periods, or multiples. In 718, the entitlement engine 140 and/or other logic can generate the billing record 150 based on the aggregate offset subscription cost 174 for each resource being tracked and/or metered for the set of users 190, and/or based on other costs, adjustments, offsets, and/or factors. In 720, the entitlement engine 140 and/or other logic, entities, or resources, such as the operator of the set of host clouds 142, can transmit the billing record 150 to an administrator for the set of users 190 and/or other user or other recipient. In 724, as understood by persons skilled in the art, processing can repeat, return to a prior processing point, jump to a further processing point, or end.

Figure 8:
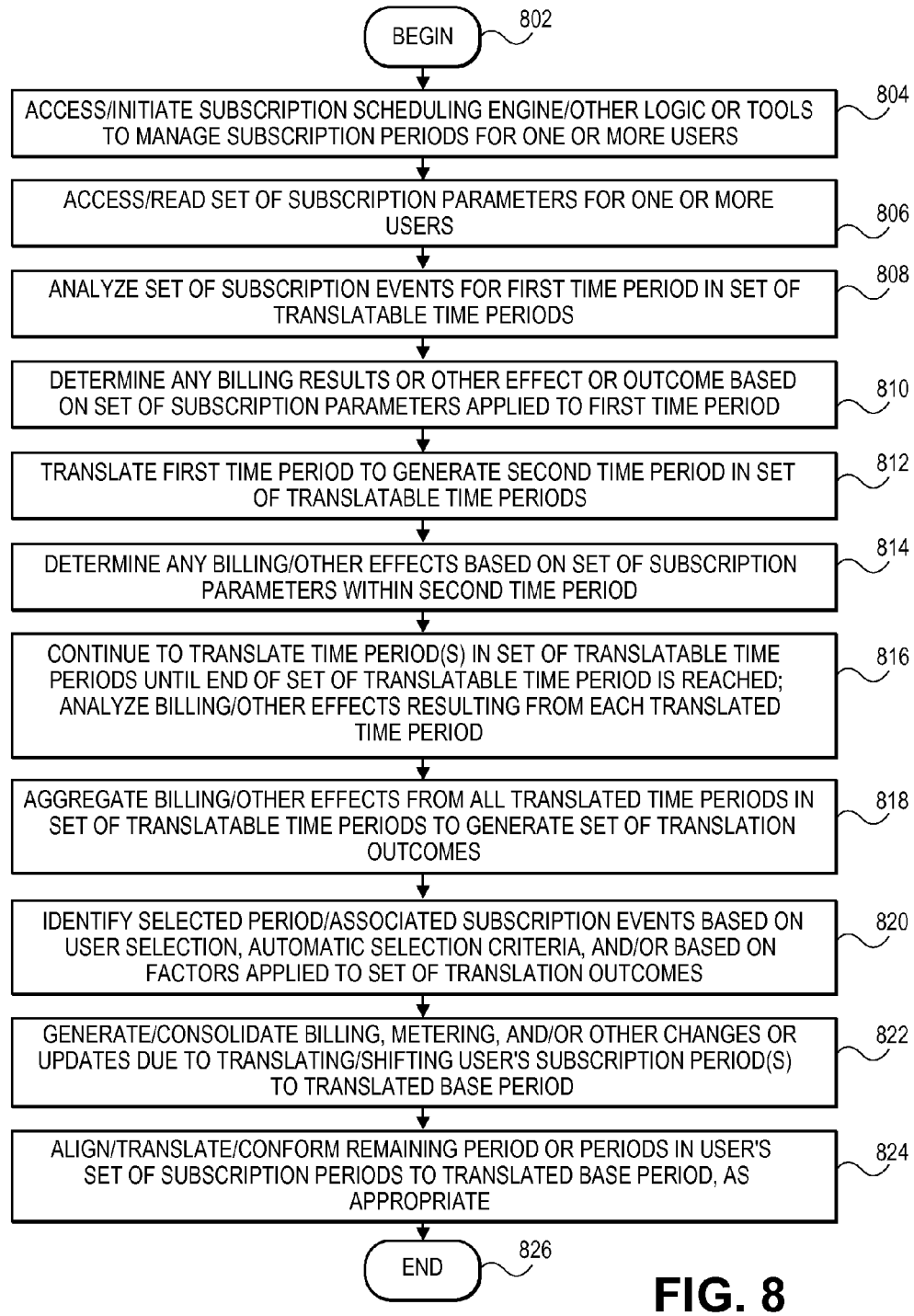
FIG. 8 illustrates a flowchart for the analysis and processing of translatable time periods that can be used in systems and methods for detecting resource consumption events over sliding intervals in cloud-based network, according to various embodiments.

FIG. 8 illustrates various processing that can be used in systems and methods for detecting resource consumption events over sliding intervals in cloud-based network to track, configurable, and/or analyze one or more sets of translatable time periods, according to aspects of the teachings. In 802, processing can begin. In 804, an administrator and/or other user can initiate the subscription schedule engine 180 and/or other logic, applications, services, or tools to manage the subscription periods for one or more users of a set of virtual machines, such as virtual machines hosted in or instantiated on one or more cloud-based networks, and/or hosted in or instantiated on one or more premise networks. In 806, the schedule engine 180 and/or other logic, logic, applications, services, or tools can access and/or read or extract the set of subscription parameters 146 for the one or more users for the set of virtual machines 116, which can for instance be or include individual users and/or collections of users, such as a corporation and/or other entity. In 808, the schedule engine 180 and/or other logic, application, and/or service can analyze the set of subscription events 182 and/or other conditions or events for the first time period 184 in the set of translatable time periods set of translatable time periods 186. In aspects, the set of subscription events 182 can be or include events such as, for example, the reaching or exceeding of one or more resource consumption limits for a given user as encoded in the user's set of subscription parameters 146. In aspects, the set of subscription events 182 can be or include other events, occurrences, and/or conditions, such as the detection of the execution of a virus or other malicious software on one or more of a given user's set of virtual machines 116, the transmission of a threshold and/or limit for email messages, instant or chat messages, and/or other messaging events, and/or other events, conditions, states, or metrics. In 810, the schedule engine 180 and/or other logic, application, and/or service can determine any billing effects, and/or other effects, results, consequences, and/or outcome based on the set of subscription parameters 146 applied to and/or analyzed based on events in the first time period 184. Thus for example, the schedule engine 180 and/or other logic, application, and/or service can determine that by applying a one-hour window as the first time period 184, a total of three resource over-consumption events would apply or take place with that first time period 184. The resource over-consumption events could reflect, for instance, that three times with the first time period 184, the number of operating system instances instantiated by or operated by the user can exceed a consumption limit of 200 instances, each time followed by a decrease below that limit. Other events in the set of subscription events 182 can take place in the first time period 184, and/or in cases, no events in the set of subscription events 182 can be reflected in the first time period 184.

In 812, the schedule engine 180 and/or other logic, application, and/or service can translate the first time period 184 to generate a second time period 188 in the set of translatable time periods 186. In aspects, the first time period 184 can be translated to the second time period by incrementing the first time point or timestamp in the first time period 184 by one increment. In aspects, the increment can comprise the smallest time interval or clock "tick" recorded in the set of aggregate usage history data 148 and/or other record, such as, merely for example, 1 minute, 15 minutes, and/or other intervals or values. In aspects, the increment can comprise an increment which is larger than the smallest time interval or clock "tick" recorded in the set of aggregate usage history data 148 and/or other record, such as, merely for example, 15 minutes, 30 minutes, 45 minutes, or an hour. Other increments, functions, and/or techniques can be used to translate or "slide" the first time period 184 by some amount or degree to create or advance to the second time period 188.

In 814, the schedule engine 180 and/or other logic, application, and/or service can analyze the set of subscription events 182 for the second time period 188 in the set of translatable time periods 186. In aspects, the set of subscription events 182 can be or include events such as, for example, the reaching or exceeding of one or more resource consumption limits for a given user as encoded in the user's set of subscription parameters 146. In aspects, the set of subscription events 182 can be or include other events, occurrences, and/or conditions, and those events or occurrences can likewise be identified and analyzed for the second time period 188, including to detect or identify effects and/or changes to the subscription costs, billing details, metering, and/or other outcomes based on applying the set of subscription parameters 146 to the user's set of usage history data in the second time period 188.

In 816, the schedule engine 180 and/or other logic, application, and/or service can continue to translate time period or periods in the set of translatable time periods 186 until the end of the set of translatable time periods 186 is reached, with the billing and/or other effects or results from those time shifts analyzed for each translated time period. In 818, the schedule engine 180 and/or other logic, application, and/or service can aggregate or combine the billing and/or other effects or results of the time period translation for all of the translated time periods in the set of translatable time periods 186, to generate the set of translation outcomes 191. In aspects, the set of translation outcomes 191 can represent or encode the set of all possible billing, metering, and/or other effects or outcomes to the user's billing parameters and/or other subscription arrangements, due to the effects of translating and/or shifting the subscription periods over the set of translatable time periods 186. In 820, the schedule engine 180 and/or other logic, application, and/or service can identify and/or select a translation base period 192 and/or associated subscription events based on a set of selection criteria 194, which can include, merely for example, user selections or inputs, automatic selection criteria, and/or based on other factors, variables, tests, thresholds, and/or criteria applied to the set of translation outcomes 191. For instance, the set of selection criteria 194 can specify the selection of the translation base period 192 to coincide with that one-hour subscription period in which the user's subscription costs based on the occurrence or sequence of over-consumption events is reduced or minimized. For further instance, the set of selection criteria 194 can specify the selection of the translation base period 192 to coincide with that one-hour subscription period in which the operator of the cloud or other or other network hosting the user's set of virtual machines 116 realizes the greatest subscription fees or value, based on identifying the occurrence or sequence of over-consumption events whose fees or revenues are maximized over the translation based period 192. Other factors, variables, tests, thresholds, and/or criteria, and/or combinations of those criteria, can be applied to the set of translatable time periods 186 to generate, develop, or identify the translation base period 192.

In 822, the schedule engine 180 and/or other logic, application, and/or service can generate and/or consolidate all billing, metering, and/or other changes or updates due to translating or shifting the user's subscription period(s) to the translated base period 192. In 824, the schedule engine 180 and/or other logic, application, and/or service can align, translate, shift, and/or conform one or more remaining period or periods in the user's set of subscription periods to the translated base period 192, as appropriate. For instance, already-recorded and/or future subscription periods reflected in the user's set of usage history data can be updated to start at the same time point, and/or times offset from the same time point, at which the translated base period 192 was selected to begin. In 826, processing can jump to a prior processing point, proceed to a further processing point, repeat, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. For further example, while embodiments have been described in which a user connects to or accesses the entitlement engine 140 via one client 154, in embodiments, multiple clients, portals, services, and/or other access points to the entitlement engine 140 can be used. Likewise, while embodiments have been described in which one entitlement engine 140 and/or schedule engine 180 operate to manage the resource consumption, billing, and/or other activities of one or more users in a set of host clouds 142, in embodiments, multiple deployment engines, schedule engines, and/or other logic or services can perform the same or similar logic to manage deployment options. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    accessing a set of usage history data comprising a set of subscription events for a virtual machine;
    generating, by a processor, a set of translatable time periods to which the set of subscription events can be assigned, wherein each of the set of translatable time periods is temporally shifted from others of the set of translatable time periods and each of the set of subscription events is assigned to one or more corresponding translatable time periods of the set of translatable time periods;
    generating, by the processor, a set of translation outcomes for a user of the virtual machine for the translatable time periods in view of assigned subscription events, wherein the set of translation outcomes comprises an identified change in a set of subscription costs of the user over the set of translatable time periods;
    identifying a translated base period from the set of translatable time periods for which the set of subscription parameters will be applied to the set of usage history data in view of applying selection criteria to the set of translation outcomes, wherein the set of subscription parameters comprises a resource consumption limit for a set of resources consumed by the virtual machine; and
    tracking resource usage of the user in view of the identified translated base period to determine an alternate set of subscription costs.

2. The method of claim 1, wherein the set of subscription events comprises events at least one of meeting or exceeding the resource consumption limit for at least one resource in the set of resources.

3. The method of claim 1, wherein the set of subscription events comprises execution of malicious software on the virtual machine.

4. The method of claim 1, wherein the set of subscription events comprises exceeding a message transmission threshold.

5. The method of claim 1, wherein generating the set of translatable time periods comprises:
    identifying a time point in a first translatable time period; and generating remaining translatable time periods in the set of translatable time periods by incrementing the time point in the first translatable time period.

6. The method of claim 5, wherein the incrementing of the time point comprises incrementing the time point by a smallest time interval recorded in the set of usage history data.

7. The method of claim 5, wherein generating the set of translatable time periods comprises:
sliding the first translatable time period by an amount to create remaining translatable time periods in the set of translatable time periods.

8. The method of claim 1, wherein the identified change comprises determining that the set of subscription costs decreases in view of the translated base period.

9. The method of claim 1, wherein the identified change comprises determining that the set of subscription costs increases in view of the translated base period.

10. The method of claim 1, wherein generating the set of translation outcomes comprises:
analyzing the set of subscription parameters in view of the set of translatable time periods to determine at least one of a source over-consumption event, a resource under-consumption even, or an effect related to subscription costs.

11. A system comprising:
a memory to store a set of subscription parameters comprising a resource consumption limit for a set of resources consumed by a virtual machine, and a set of usage history data comprising a set of subscription events for the virtual machine;
a processor, coupled to the memory, to:
generate a set of translatable time periods to which the set of subscription events can be assigned, wherein each of the set of translatable time periods is temporally shifted from others of the set of translatable time periods and each of the set of subscription events is assigned to one or more corresponding translatable time periods of the set of translatable time periods;
generate a set of translation outcomes for a user of the virtual machine for the translatable time periods in view of assigned subscription events, wherein the set of translation outcomes comprises an identified change in a set of subscription costs of the user over the set of translatable time periods;
identify a translated base period from the set of translatable time periods for which the set of subscription parameters will be applied to the set of usage history data in view of applying selection criteria to the set of translation outcomes, wherein the set of subscription parameters comprises a resource consumption limit for a set of resources consumed by the virtual machine; and
track resource usage of the user in view of the identified translated base period to determine an alternate set of subscription costs.

12. The system of claim 11, wherein the set of subscription events comprises events at least one of meeting or exceeding the resource consumption limit for at least one resource in the set of resources.

13. The system of claim 11, wherein the set of subscription events comprises execution of malicious software on the virtual machine.

14. The system of claim 11, wherein the set of subscription events comprises exceeding a message transmission threshold.

15. The system of claim 11, wherein to generate the set of translatable time periods comprises:
identifying a time point in a first translatable time period; and
generating remaining translatable time periods in the set of translatable time periods by incrementing the time point in the first translatable time period.

16. The system of claim 15, wherein the incrementing of the time point comprises incrementing the time point by a smallest time interval recorded in the set of usage history data.

17. The system of claim 15, wherein to generate the set of translatable time periods comprises:
sliding the first translatable time period by an amount to create remaining translatable time periods in the set of translatable time periods.

18. The system of claim 11, wherein the identified change comprises determining that the set of subscription costs decreases in view of the translated base period.

19. The system of claim 11, wherein the identified change comprises determining that the set of subscription costs increases in view of the translated base period.

20. The system of claim 11, wherein to generate the set of translation outcomes comprises:
analyzing the set of subscription parameters in view of the set of translatable time periods to determine at least one of a source over-consumption event, a resource under-consumption even, or an effect related to subscription costs.

* * * * *